United States Patent
Huff et al.

(10) Patent No.: US 11,840,675 B2
(45) Date of Patent: Dec. 12, 2023

(54) ORGANOSILOXANE-BASED SURFACE TREATMENTS FOR ENHANCING THE ADHESION AND LUBRICITY OF METAL SURFACES

(71) Applicant: The Boeing Company, Chicago, IL (US)

(72) Inventors: Daniel W. Huff, Huntsville, AL (US); James A. Moore, Madison, AL (US); Justin J. Robertson, Mesa, AZ (US); Gregory T. Strawder, Chandler, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 18/055,962

(22) Filed: Nov. 16, 2022

(65) Prior Publication Data
US 2023/0089804 A1 Mar. 23, 2023

Related U.S. Application Data

(62) Division of application No. 16/856,287, filed on Apr. 23, 2020, now Pat. No. 11,530,362.

(51) Int. Cl.
*C10M 139/04* (2006.01)
*C10M 103/06* (2006.01)
*C10M 125/04* (2006.01)

(52) U.S. Cl.
CPC ........ *C10M 103/06* (2013.01); *C10M 139/04* (2013.01); *C10M 125/04* (2013.01); *C10M 2201/0663* (2013.01)

(58) Field of Classification Search
CPC .......... C10M 103/06; C10M 139/04; C10M 125/04; C10M 2201/0663; C08K 3/24; C08K 3/30; C08K 2003/3009; C09D 183/06; C09D 7/20; C09D 7/61; C09D 5/086; C09D 5/084; C09D 7/63; C09D 183/08; C09D 4/00; C09D 5/08;
(Continued)

(56) References Cited

U.S. PATENT DOCUMENTS 5,869,141 A  2/1999 Blohowiak et al.
2004/0206266 A1* 10/2004 Maze .................. C23C 28/021
428/397

(Continued)

FOREIGN PATENT DOCUMENTS

KR  20030044178  6/2003

OTHER PUBLICATIONS

Chinese Office Action issued in CN Application 202110428769.3, dated Aug. 7, 2023.

*Primary Examiner* — Prem C Singh
*Assistant Examiner* — Francis C Campanell

(57) ABSTRACT

Compositions for treating a substrate to provide increased lubricity to portions of the substrate surface that come into contact with the surface of a mating component are provided. The treated substrates provide improved lubricity, while maintaining adhesion between the surface of the substrate and an overlying polymer coating and imparting corrosion resistance to the substrate surface. The compositions include a silanol coupling agent in combination with lubricating particles, and an acid, which are dissolved or dispersed in a mixture of organic solvent and water.

20 Claims, 7 Drawing Sheets

(58) Field of Classification Search
CPC ...... B05D 5/08; B05D 2202/00; C08G 77/14; C08G 77/26; C08G 77/28; C23C 28/00
USPC .......................................... 428/405; 508/108
See application file for complete search history.

(56) References Cited

U.S. PATENT DOCUMENTS

2018/0201795 A1* 7/2018 Hed ..................... C09D 183/08
2020/0207992 A1* 7/2020 Jana ..................... C09D 5/084

* cited by examiner

Table 1.

| Component | | Quantity in Composition | Density (g/ml) | Sample Mass (g) | % Solution by mass (wt.%) | CAS Number |
|---|---|---|---|---|---|---|
| Coupling Agent | bis[TESP]TS > 90% | 2 ml | 1.08 | 2.16 | 2.46 | 40372-72-3 |
| Solvent | methanol | 94 ml | 0.8 | 75.2 | 85.58 | 67-56-1 |
| Water | distilled water | 6 ml | 1 | 6 | 6.83 | 7732-18-5 |
| Acid | glacial acetic acid | 0.2 ml | 1.05 | 0.21 | 0.24 | |
| Corrosion Resistance Agent | sodium dichromate dihydrate | 0.3 g (0.01 M) | -- | 0.3 | 0.34 | 7789-12-0 |
| Lubricating Particles | molybdenum disulfide | 4 g | -- | 4 | 4.55 | 1317-33-5 |

FIG. 4

ORGANOSILOXANE-BASED SURFACE TREATMENTS FOR ENHANCING THE ADHESION AND LUBRICITY OF METAL SURFACES

CROSS REFERENCE TO RELATED APPLICATIONS

The present application is a divisional of U.S. patent application Ser. No. 16/856,287 that was filed Apr. 23, 2020, the entire contents of which are incorporated herein by reference.

BACKGROUND

Corrosion is a constant concern for aging, metallic structures, which increases maintenance costs while decreasing utility. Protective polymer coatings are routinely applied to minimize structural degradation due to corrosion. Conventionally, generic, non-specific solvents and coupling agents are applied to metal surfaces to prepare the surfaces for the application of protective polymer coatings. Although these solvents and coupling agents may provide some level of improvement in the adhesion between the metal surface and an applied protective coating, they do not create strong, moisture-resistant bonds between the surface and the coating.

When moisture intrudes into the interface between a protective coating and an underlying metal substrate, corrosion can develop underneath the coating, which might not be detected until it penetrates through the coating. Therefore, when coatings are applied to protect surfaces from corrosion, it is imperative that the bonding between the coating and the metal surface be strong and moisture resistant.

Another competing concern for metallic structures is the need for low friction between mating surface. Engineered structures frequently possess metal surfaces that make physical contact with each other, such as in bolted joints and fasteners. Lubricants are commonly used in these circumstances to facilitate assembly and improve part fit-up. Unfortunately, the presence of lubricants can inhibit adhesion and reduce the effectiveness of a protective coating. This can lead to poor bonding, crevice formation, moisture intrusion, and corrosion underneath the protective coating, particularly in humid environments.

SUMMARY

Compositions for treating a substrate to provide increased lubricity to portions of the substrate surface that come into contact with the surface of a mating component are provided. Also provided are methods of treating substrates with the compositions and substrates coated with sol-gels formed from the compositions.

One example of a composition includes: water; one or more organic solvents; one or more silanol coupling agents dissolved in the water and the one or more organic solvents; lubricating particles; and one or more acids. The composition has a pH of 7 or lower. The concentration of silanol coupling agent in the composition is in the range from 20 wt. % to 50 wt. %, based on the solids content of the composition, and the concentration of lubricating particles in the composition is in the range from 50 wt. % to 80 wt. %, based on the solids content of the composition.

One example of a method of treating the surface of a substrate includes applying a composition to the surface of the metal substrate, the composition including: water; one or more organic solvents; one or more silanol coupling agents dissolved in the water and the one or more organic solvents; lubricating particles; and one or more acids. The composition has a pH of 7 or lower. The concentration of silanol coupling agent in the composition is in the range from 20 wt. % to 50 wt. %, based on the solids content of the composition, and the concentration of lubricating particles in the composition is in the range from 50 wt. % to 80 wt. %, based on the solids content of the composition. The method further includes drying and curing the applied composition to form a sol-gel film on the surface of the metal substrate; and applying a polymer coating over the sol-gel film.

One example of a coated substrate includes: a substrate having a surface; a sol-gel film on the surface of the substrate; and a polymer coating one the sol-gel film. The sol-gel film includes one or more silanol coupling agents and lubricating particles. The concentration of silanol coupling agent in the sol-gel film is in the range from 20 wt. % to 50 wt. %, based on the solids content of the sol-gel film, and the concentration of lubricating particles in the sol-gel is in the range from 50 wt. % to 80 wt. %, based on the solids content of the sol-gel film;

Other principal features and advantages of the disclosure will become apparent to those skilled in the art upon review of the following drawings, the detailed description, and the appended claims.

BRIEF DESCRIPTION OF THE DRAWINGS

Illustrative examples of the disclosure will hereafter be described with reference to the accompanying drawings, wherein like numerals denote like elements.

FIG. 4 is a table showing formulation for the coating composition of the Example.

DETAILED DESCRIPTION

Figure 1:
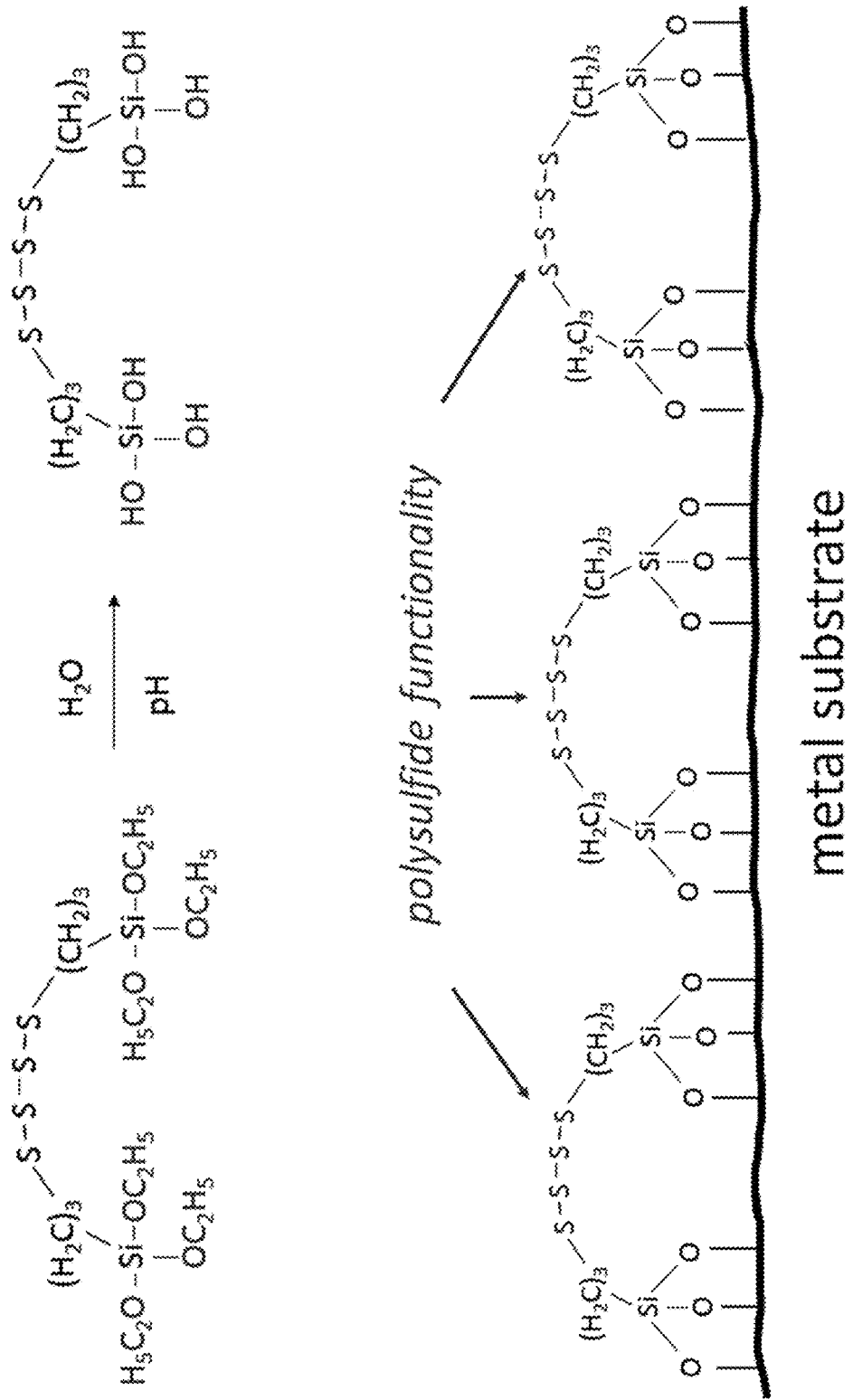
FIG. 1 shows a reaction scheme for the hydrolysis of bis(triethoxysilylpropyl)tetrasulfide (bis[TESP]TS) (upper panel) and the binding of hydrolyzed bis[TESP]TS to a surface of a metal substrate (lower panel).

Compositions for treating a substrate to provide increased lubricity to portions of the substrate surface that come into contact with the surface of a mating component are provided. The treated substrates provide improved lubricity, while maintaining exceptional adhesion between the surface of the substrate and an overlying polymer coating and imparting superior corrosion resistance to the substrate surface. Also provided are substrates coated with films formed from the compositions and structures that incorporate the films. Methods for making and using the compositions are further provided. Although the compositions can be used to treat any substrate having a surface that is susceptible to corrosion, the compositions are particularly useful for the treatment of metal substrates, such as steel substrates, that are highly prone to oxidation.

The compositions include a silanol coupling agent in combination with lubricating particles, and an acid, which are dissolved or dispersed in a mixture of organic solvent and water. The water may be deionized (DI) water or tap water.

The silanol coupling agents can be formed by the hydrolysis of organofunctional alkoxysilanes. Organofunctional alkoxysilanes are compounds having the structure $(X)_n$—Si—$(R^2O)_{(4-n)}$, where X is an organofunctional group or a sulfide or polysulfide group, each $R^2$ is, independently, a substituted or unsubstituted, linear or branched alkyl group, and n is 1, 2, or 3. The X groups may be joined to the silicon groups by a carbon-silicon bond. By way of illustration, suitable $C_{1-20}$ alkyl groups include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl groups; suitable organofunctional groups include epoxy groups, vinyl groups, allyl groups, and amino groups; and suitable polysulfide chains include those having the structure $S_x$, where $2 \leq x \leq 10$, including those having the structure $S_x$, where $2 \leq x \leq 5$. In some examples of the compositions, the organofunctional alkoxysilanes are dipodal organofunctional alkoxysilanes having two silicon atoms in their structure. Thus, some examples of dipodal organofunctional alkoxysilanes can be represented by the structure —$(R^2O)_3$—Si—(X)—Si—$(R^2O)_3$. The use of dipodal organofunctional alkoxysiloxanes is advantageous because such molecules have a greater number of hydrolysable groups and, therefore, may produce dipodal organosilanol coupling agents having two or more silanol groups and, therefore, stronger binding to a substrate. Bis[TESP]TS is an example of one such dipodal organofunctional alkoxysilane from which an organosilanol can be formed. The structure of bis[TESP]TS and the silane triol that is produced by the hydrolysis thereof are shown in the upper panel of FIG. 1. Bis[TESP]TS and other organofunctional alkoxysilane that produce organosilanols having organofunctional groups that include a polysulfide chain can be used to adhere coatings that include, for example, sulfide functionalities, such as polythioester and polysulfide group-containing elastomers, as illustrated in the lower panel of FIG. 1.

In other examples of the compositions, the organofunctional alkoxysilanes have the structure X—$R^1$—Si—$(R^2O)_3$, where X is an epoxy group, $R^1$ is a substituted or unsubstituted, linear or branched alkyl group, and $R^2$ is as defined above. GPTMS is an example of one such organofunctional alkoxysilane. The structure of GPTMS and the silane triol that is produced by the hydrolysis thereof are shown in the upper panel of FIG. 2. GPTMS and other organofunctional alkoxysilane that produce organosilanols having organofunctional groups that include an epoxy functionality can be used to adhere coatings that include, for example, epoxy functionalities, hydroxyl functionalities, and/or phenolics, as illustrated in the lower panel of FIG. 2.

In other examples of the compositions, the organofunctional alkoxysilanes have the structure X—$R^1$—Si—$(R^2O)_3$, where X is an amine group, such as $NH_2$, $R^1$ is a substituted or unsubstituted, linear or branched alkyl group, and $R^2$ is as defined above. Aminopropyltriethoxy silane (APTES) and aminopropyltrimethoxy silane (APTMS) are examples of such organofunctional alkoxysilanes. APTMS, APTES, and other organofunctional alkoxysilane that produce organosilanols having organofunctional groups that include an amine functionality can be used to adhere coatings that include, for example, carboxyl functionalities.

Hydrolysis of the hydrolysable $R^2O$ groups of the organofunctional alkoxysilanes into hydroxyl groups (—OH) converts the alkoxysilanes into silanols that are able to form bonds to both a substrate surface and an overlying polymer coating. Depending on the hydrolysis conditions, all or fewer than all of the hydrolysable $R^2O$ groups can be hydrolyzed to provide the silanol coupling agents. Thus, in some examples of the compositions, all of the hydrolysable $R^2O$ are hydrolyzed to —OH groups, while in other examples, the compositions comprise partially hydrolyzed alkoxysiloxanes that include both $R^2O$ and —OH groups and/or comprise a mixture of fully hydrolyzed and partially hydrolyzed alkoxysiloxanes. Generally, however, it is desirable for most (for example, at least 70 mol. %, at least 90 mol. %, or at least 99 mol. %) of the $R^2O$ to be hydrolyzed.

The hydroxyl groups of the hydrolyzed alkoxysilanes are able to react with reactive groups, such as hydroxyl groups, on a substrate surface, while the organofunctional groups, X, provide binding to an overlying coating. Thus, the organofunctional groups can be selected to provide strong binding to the particular polymer coating that will be applied to the surface of the substrate.

The concentration of the silanol coupling agent in the compositions should be sufficiently high to provide an adhesive film with adequate adhesion to both a substrate surface and its overlying polymer coating for a given application, wherein applications with stricter operational tolerances may benefit from a higher concentration of silanol coupling agent. Silanol coupling agent may be present in amounts in excess of that needed to provide the desired degree of adhesion; however, the addition of silanol coupling agent above a concentration at which it continues to increase the adhesion between the substrate and the coating may increase costs without additional gain. Typically, adequate adhesion can be attained by compositions having a silanol coupling agent concentration in the range from 0.5 to 5 weight percent (wt. %). This includes examples of the compositions having a silanol coupling agent concentration in the range from 1 wt. % to 4 wt. % and further includes examples of the compositions having a silanol coupling agent concentration in the range from 2 wt. % to 3 wt. %. The corresponding volume percent (vol. %) will depend upon the particular silanol coupling agent used. By way of illustration various examples of the compositions have a silanol coupling agent content in the range from 1 vol. % to 4 vol. %.

Optionally, one or more non-silanol coupling agents, such as zirconium tetrapropoxide, can be included in the compositions, in addition to the one or more silanol coupling agents.

The lubricating particles present in the compositions are solid particulates that reduce the heat, wear, and/or deformation of one or both of a substrate surface and a mating surface with which the substrate surface is in physical contact via a sliding, rolling, or other motion, by reducing the coefficient of friction between the two surfaces. The reduction in the coefficient of friction is relative to the coefficient of friction provided by a composition that lacks the lubricating particles, but is otherwise the same, and can be measured as the coefficient of static friction using the methods described in the Example. Various examples of the films formed from the compositions are able to reduce the coefficient of static friction by at least 25%, relative to the coefficient of friction in the absence of the film. This includes films that reduce the coefficient of static friction by at least 30% and at least 40%. Examples of mating surfaces that stand to benefit from the lubricating properties of the compositions include metal substrate surfaces and the surfaces of other metal components. For example, the surface of a fastener, such as a screw thread or a screw head, may come into sliding contact with portions of a metal substrate surface.

The lubricating particles can be composed of inorganic or organic materials. Examples of suitable lubricating particles include metal disulfide particles, such as molybdenum disulfide ($MoS_2$) particles and/or tungsten disulfide ($WS_2$) particles, graphite particles, hexagonal boron nitride (hBN) particles, polymer particles, such as polytetrafluoroethylene (PTFE) particles, ethylene-bis-stearamide (EBS) particles, 5,5-dithiobis(1,3,4-thiadiazole-2(3H)-thione) particles and mixtures of two or more thereof. Lubricating particles having a range of shapes and sizes can be used, including spherical particles, rod-shaped particles, and flakes. By way of illustration, some examples of the compositions include lubricating particles having sizes in the range from 10 nm to 100 μm. This includes examples of the compositions that include lubricating particles having sizes in the range from 1 μm to 50 μm and in the range from 5 μm to 25 μm.

The concentration of lubricating particles in the compositions should be sufficiently high to provide a substrate surface with adequate lubricity for a given application, wherein a higher concentration of lubricating particles may be beneficial for applications in which a high degree of lubricity is key. Lubricating particles may be present in amounts in excess of that needed to provide the desired degree of lubricity; however, the inclusion of lubricating particles above a concentration at which they continue to decrease the coefficient of friction between a substrate surface and a mating surface may increase costs without additional gain. Typically, adequate lubricity can be attained by compositions having a lubricating particle concentration in the range from 0.5 wt. % to 5 wt. %. This includes examples of the compositions having a lubricating particle concentration in the range from 0.5 wt. % to 3 wt. % and further includes examples of the compositions having a lubricating particle concentration in the range from 1 wt. % to 3 wt. %. The corresponding vol. % ranges will vary based on the particular lubricating particles being used, but may be, for example, in the range from 0.10 vol. % to 1.0 vol. %.

In addition to the components discussed above, the compositions may further include a corrosion resistance agent as an optional component. The corrosion resistance agents are compounds that render the surfaces of the substrates to which they are applied less susceptible to corrosion by water or to oxidation in an oxygen-containing environment. As used herein, corrosion refers to a chemical reaction between the substrate and a chemical species in its surrounding environment that leads to the deterioration of one or more substrate properties. For example, oxidation of a metal by oxygen or water vapor in the air can result in the corrosion of the metal.

The enhancement in corrosion resistance is relative to the corrosion resistance provided by a composition that lacks the corrosion resistance agent, but is otherwise the same, and can be measured using visual examination, such as the ASTM B117 -19 97 (Reapproved 2014) method, in which samples are evaluated after exposure to 0.5% neutral salt spray. Electrochemical methods, such as DC polarization (e.g., per ASTM G59), are also commonly used to evaluate corrosion characteristics. In some examples of the compositions, the corrosion resistance agent is an inorganic metal salt, such as a metal nitrate salt or a metal halide salt. Inorganic metal salts include salts of chromium, molybdenum, magnesium, zirconium, titanium, vanadium, cerium (e.g., cerium nitrate), hafnium, silicon, aluminum, boron, cobalt, zinc, and combinations of two or more such salts. Suitable chromium salts and dichromate salts include those comprising hexavalent chromium compounds, such as $CrO_3$, $CrO_4^{2-}$, and $Cr_2O_7^{2-}$.

The concentration of the corrosion resistance agent in the compositions should be sufficiently high to provide a substrate surface with adequate corrosion resistance for a given application, wherein a higher concentration of corrosion resistance agent may be beneficial for applications in which suppression of corrosion is key. Corrosion resistance agents may be present in amounts in excess of that needed to provide the desired degree of corrosion resistance; however, the inclusion of corrosion resistance agents above a concentration at which they continue to increase corrosion resistance may increase costs without additional gain. Typically, adequate corrosion resistance can be attained by compositions having a corrosion resistance agent concentration in the range from 0.1 wt. % to 1 wt. %. This includes examples of the compositions having a corrosion resistance agent concentration in the range from 0.2 wt. % to 0.8 wt. % and further includes examples of the compositions having a corrosion resistance agent concentration in the range from 0.3 wt. % to 0.5 wt. %.

Although water is generally a preferred solvent material, for situations where solute components possess limited solubility in water, organic solvents can be employed, where the percentage of organic solvent in the final composition depends upon the solubility/insolubility characteristics of the components. When solvents are employed, the various components of the compositions are dissolved or dispersed in one or more organic solvents. Suitable solvents for dissolving or dispersing the components of the composition are polar organic and/or non-polar organic solvents. Polar organic solvents are generally useful for dissolving components such as corrosion resistance agents because such agents are typically soluble in polar organic solvents. Examples of suitable organic solvents include alcohols (e.g., methanol, ethanol, propanol, isopropanol, butanol, pentanol, and/or hexanol), acetone, ethylene glycol, propylene glycol, polyethylene glycol, polypropylene glycol, ether (e.g., dimethyl ether or dipropylene glycol dimethyl ether), glycol ether, tetrahydrofuran (THF), N-methyl-2-pyrrolidone (NMP), dimethyl sulfoxide (DMSO), and mixtures of two or more thereof. In at least one aspect, an organic solvent is selected from at least one of methanol, ethanol, n-propanol, isopropanol, 1-butanol, 2-butanol, 1-pentanol, 2-pentanol, 3-pentanol, 1-hexanol, 2-hexanol, and 3-hexanol. Because the adhesive films are formed from the compositions by the evaporation of the solvents after the compositions are applied to a substrate, it is generally desirable to use solvents in which the components have substantial solubility or dispersibility and that have high flash points. In addition, solvents that degrade the substrate to which they are applied and/or the overlying organic coatings should be avoided. Generally, the solvents will make up the balance of the compositions formulated with the various other components described herein and, optionally, other additives.

Figure 2:
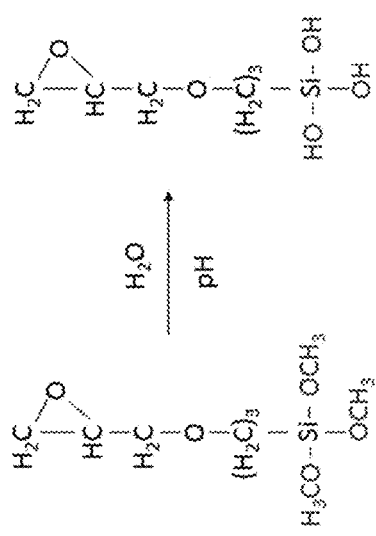
FIG. 2 shows a reaction scheme for the hydrolysis of 3-glycidoxypropyltrimethoxy silane (GPTMS) (upper panel) and the binding of hydrolyzed GPTMS to a surface of a metal substrate (lower panel).
Figure 2:
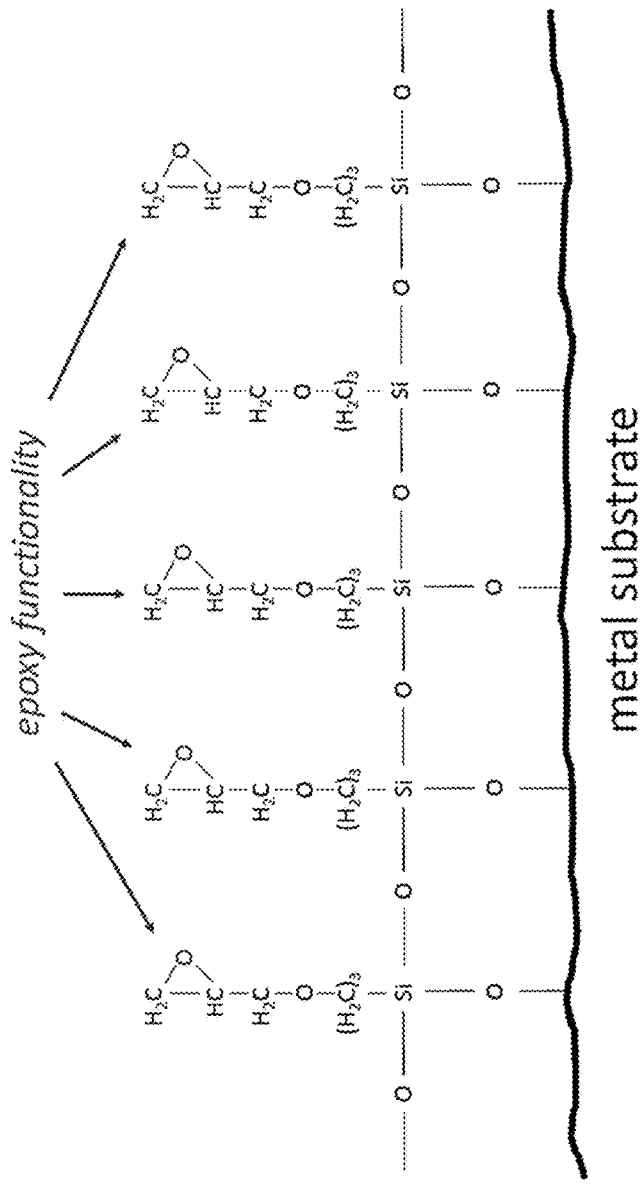

Water is used as a solvent in the compositions in order to enable the hydrolysis of the $R^2O$ groups of the organofunctional alkoxysilanes, as illustrated in FIG. 1 and FIG. 2, but can also be used (at least, in part) as the base solvent, depending upon the solubility characteristics of the components. However, the water content of the compositions should be limited in order to allow water-insoluble components, such as some organofunctional alkoxysilanes and the silanols made by the hydrolysis thereof, to remain solubilized in the solution. By way of illustration, some examples of the compositions use a solvent mixture comprising water and one or more organic solvents, wherein the solvent mixture has a water content in the range from 1 vol. % to 12 vol. %. This includes examples of the solvent mixtures having a water content in the range from 2 vol. % to 10 vol.

% and further includes examples of the compositions having a water content in the range from 4 vol. to 8 vol. %.

Acid is included in the compositions in order to render the compositions acidic (pH<7), which facilitates the hydrolysis of the $R^2O$ groups of the organofunctional alkoxysilanes. By way of illustration, the acid content of the compositions may provide the composition with a pH in the range from 1 to 6. This includes examples of the compositions having a pH in the range from 2 to 5 and further includes examples of the compositions having a pH in the range from 3 to 4. Generally, acid concentrations in the range from 0.1 wt. % to 1 wt. % are sufficient. This includes acid concentration in the range from 0.2 wt. % to 0.7 wt. %. The corresponding vol. % ranges will vary based on the particular acids being used, but may be, for example, in the range from 0.1 vol. % to 1.0 vol. %. Acids that can be used include organic acids. Organic acids include acetic acid (such as glacial acetic acid) or citric acid. In addition to being a commonly-available weak organic acid, glacial acetic acid can reduce pH without significantly altering the volume of the solution. Weaker acids (e.g., those having a pKa greater than that of acetic acid) may also be used, such as glycols, ethoxyethanol, or $H_2NCH_2CH_2OH$.

The compositions can be produced by forming a mixture of the one or more solvents, the water, and the organofunctional alkoxysilane. Adequate mixing of these components generally can be achieved with stirring for a time of one minute to one hour; however, stirring is not required, and longer or shorter mixing times can be used. Full or partial hydrolysis of the organofunctional alkoxysilanes is then allowed to occur, preferably with stirring, although stirring is not required. Typically, a hydrolysis period of 1 minute to 48 hours at room temperatures (e.g., 21 to 25° C.) will provide sufficient hydrolysis; however, longer or shorter hydrolysis times can be used. For example, hydrolysis times of two hours or less may be sufficient. The lubricating particles then can be added to the resulting solution to form a suspension. If corrosion resistance agents are to be included, they can also be dissolved in the solution. Alternatively, the lubricating particles and/or the corrosion resistance agents can be added before or during the hydrolysis period. The various components that make up the composition can be added and mixed concurrently or sequentially, and it is further possible to formulate two or more mixtures comprising different components of the composition and then to mix the two or more mixtures together to form the final composition. The mixing can be carried out using, for example, shaking, a magnetic stir-bar, a high-shear mixer, and/or sonication.

Figure 3A:
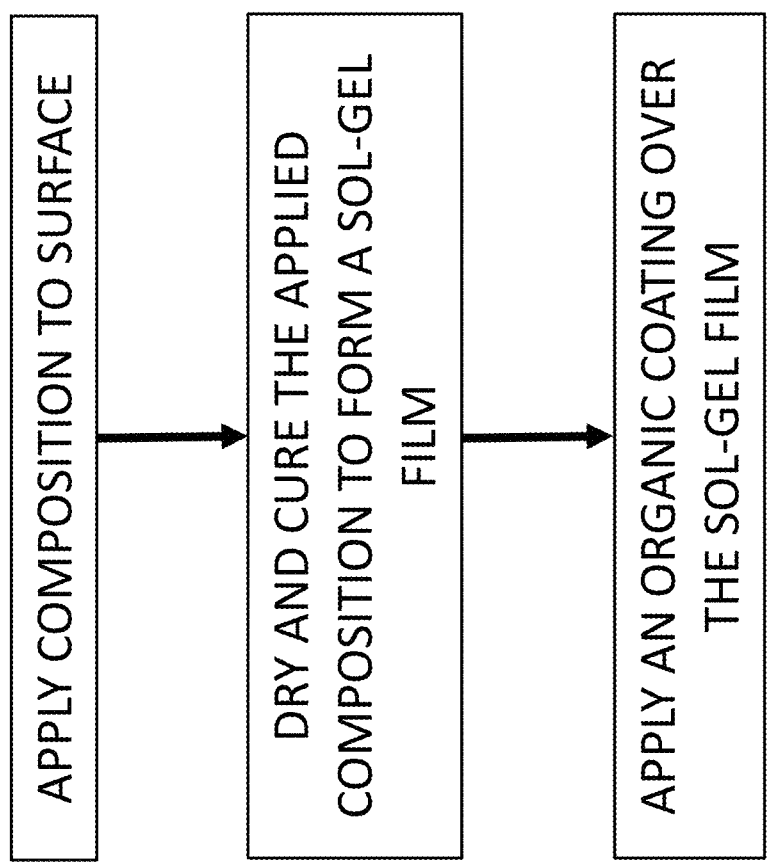
FIG. 3A is a flow diagram for a method of treating a surface of a substrate.
Figure 3B:
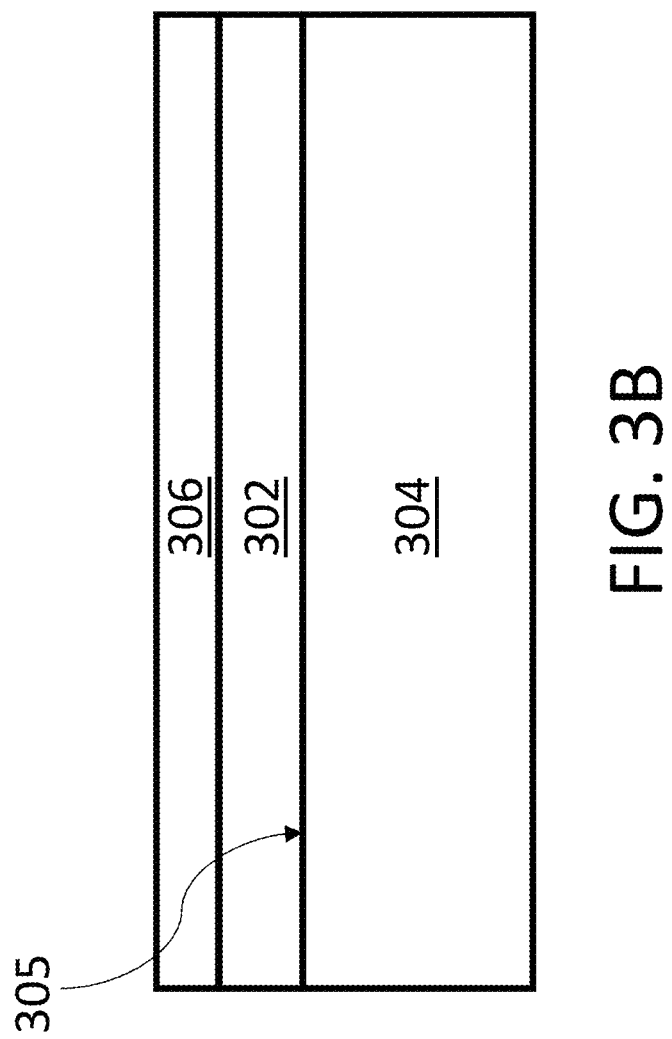
FIG. 3B is a diagram of an adhesive lubricating film between a metal substrate and an overlying coating.

Once formed, the composition can be applied to a surface of a substrate, as shown in the flow diagram of FIG. 3A. FIG. 3B is a schematic diagram illustrating the use of the compositions to form an adhesive, corrosion resistant, lubricating film 302 at an interface between a surface 305 of a substrate 304 and an organic coating 306. The composition can be applied over the entire surface 305 of substrate 304 or applied selectively to only one or more areas of surface 305. For example, the composition can be applied selectively to fastener threads and other metal joining areas. The applied composition is then dried and cured to form lubricating sol-gel film 302 on surface 305.

Substrate 304 may be a metal substrate or a non-metal substrate that is composed of a material that is susceptible to corrosion, including oxidation. Examples of substrate materials include aluminum, aluminum alloys, magnesium, magnesium alloys, nickel, nickel alloys, iron, iron alloys, steel, titanium, titanium alloys, copper, and copper alloys, as well as glass/silica and other inorganic or mineral substrates. Substrate 304 can be any suitable material and/or can include any suitable structure that benefits from the composition being applied thereto. Substrate 304 may define one or more components (such as structural or mechanical components) of environmentally exposed apparatus, such as aircraft, watercraft, spacecraft, land vehicles, equipment, civil structures, fastening components, and/or another apparatus susceptible to environmental degradation. Substrate 304 can be part of a larger structure, such as a vehicle component. A vehicle component is any suitable component of a vehicle, such as a structural component, such as landing gears, a panel, or a joint, of an aircraft, and the like. Examples of a vehicle component include a rotor blade, landing gears, an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component.

Prior to the application of the composition, surface 305 of substrate 304 may be cleaned and/or pre-treated. Generally, sol-gel film 302 will bond better to a clean, bare material substrate that is substantially free from dirt, non-reactive surface oxides, and/or corrosion products, and that is preferably populated with a sufficient concentration of reactive hydroxyl groups or other chemically-reactive functional groups. Suitable cleaning and pre-treatment methods include degreasing, an alkaline wash, chemical etching, chemically deoxidizing, and/or mechanically deoxidizing (e.g., sanding and/or abrading). Optionally, if surface 305 is not sufficiently hydroxyl-rich, silica hydroxylates can be deposited onto the surface in order to increase the concentration of surface hydroxyl groups.

The composition is then applied to surface 305. Application can be carried out using a variety of methods, including spraying, dip coating, brush coating, spin coating, and the like. Excess composition pooling on surface 305 can be removed by draining or blowing with air. The applied composition is then dried and cured to form sol-gel film 302. During the drying, volatile components, such as water and organic solvents, are allowed to evaporate. During the curing, which may take place simultaneously with the drying, a sol-gel is formed as some of the SiOH groups of the hydrolyzed organofunctional alkoxysilanes bond to surface 305, while excess SiOH groups condense to form a siloxane network. Drying and curing the composition may be performed under ambient conditions, at room temperatures, and/or at elevated temperature. By way of illustration, temperatures in the range from 10° C. to 150° C. can be used. This includes temperatures in the range from 30° C. to 100° C. and further includes temperatures in the range from 50° C. to 90° C. Drying and curing generally can be carried out for a period of 1 minute to about 48 hours. However, longer or shorter time periods can be used.

The composition of the sol-gel will correspond to the solids content of the composition from which the sol-gel is formed. The solids content includes the suspended solids and dissolved components, but does not include the organic solvents or water. Therefore, the solids content of the compositions includes the silanol coupling agents, the lubricating particles, and, if present, the corrosion resistance agents and any other suspended or dissolved additives. Thus, various examples of the compositions and the sol-gels formed therefrom have a silanol coupling agent concentration in the range from 20 wt. % to 70 wt. % and a lubricating particle concentration in the range from 10 wt. % to 80 wt. %, based on the solids content of the composition. This includes examples of the compositions and the sol-gel films formed therefrom having a silanol coupling agent concentration in the range from 20 wt. % to 50 wt. % and a lubricating particle concentration in the range from 50 wt. % to 80 wt. %, based on the solids content of the composition, further includes examples of the compositions and the sol-gels formed therefrom having a silanol coupling agent concentration in the range from 25 wt. % to 45 wt. % and a lubricating particle concentration in the range from 55 wt. % to 75 wt. %, based on the solids content of the composition, and still further includes examples of the compositions and the sol-gels formed therefrom having a silanol coupling agent concentration in the range from 30 wt. % to 40 wt. % and a lubricating particle concentration in the range from 60 wt. % to 80 wt. %, based on solids content of the composition. When corrosion resistance agents are used, the compositions and the sol-gels made therefrom typically have a concentration in the range from 0.1 wt. % to 10 wt. %, based on solids content. This includes examples of the compositions and sol-gels formed therefrom having a corrosion resistance agent content in the range from 0.5 wt. % to 6 wt. %, based on solids content, and further includes examples of the compositions and sol-gels formed therefrom having a corrosion resistance agent content in the range from 1 wt. % to 5 wt. %, based on solids content.

A polymer coating 306 is then applied over sol-gel film 302, whereby sol-gel film 302 adheres polymer coating 306 to substrate 304, enhances the corrosion resistance of surface 305 by acting as a diffusion barrier to water and/or oxygen, and imparts lubricity to surface 305. Polymer coating 306 comprises one or more polymers. As used herein, polymer refers to a material that includes a backbone chain of carbon atoms covalently linked to one another and/or to hydrogen, oxygen, and/or nitrogen atoms. The chains of the polymers may be relatively short, as in the case of oligomers having, for example, five to ten atom chains, which are considered polymers for the purpose of this disclosure, or can be very long. Examples of the types of polymers that can be used in the coatings include, as poly(meth)acrylates, polyurethanes, polyethers, and polyesters. The coatings may be applied in the form of compositions that include polymer precursor molecules that can be polymerized into polymers and/or used to crosslink polymer chains. Precursor molecules include monomers, oligomers, and other polymers. As discussed above, the polymer coatings include functional groups, such as thiol groups, epoxy groups, and/or hydroxyl groups, that are reactive with functional groups in the particular sol-gel film that is formed on the substrate. Examples of the types of polymer coatings that may be applied over sol-gel film 302 include sealants, primers, paints, and adhesives.

The polymer coatings can be applied using a variety of methods, including spraying, dip coating, brush coating, spin coating, and the like. If the polymer coating contains volatile liquids, such as water and/or organic solvents, these can be removed via evaporation to provide a dried layer of the polymer. If the coating composition includes polymer precursors, these can be cured to form a polymerized and/or crosslinked polymer film.

EXAMPLES

Example 1

This example illustrates the formulation of a composition for treating a substrate to provide increased lubricity to the substrate surface, while simultaneously imparting adhesive and corrosion resistance properties to the substrate surface. In the illustrative examples of the compositions described herein bis[TESP]TS is used to form the silanol coupling agent and molybdenum disulfide particles are used as the lubricating particles. The polysulfide functionalities of the bis[TESP]TS render the compositions well-suited for use in forming adhesive films between a metal substrate and an overlying polysulfide and/or polythioether coating.

Example compositions, with illustrative concentration ranges, as well as the specific formulation used in this example, are listed in Table 1 in FIG. 4. All of the components shown in Table 1 can be purchased from MilliporeSigma.

To make the composition, 6 ml distilled $H_2O$ was added to 94 ml methanol in an Erlenmeyer flask at ambient temperature. While stirring, 0.2 ml of glacial acetic acid was pipetted into the flask. A quantify of 2 ml bis[TESP]TS then pipetted into flask, while the solution in the flask was stirred. The resulting solution was then left for 17-24 hours to allow the hydrolysis of the bis[TESP]TS to its silanol form. To enhance corrosion resistance, 0.01 M $Na_2Cr_2O_7 \cdot 2H_2O$, was added. Finally, 1 g $MoS_2$ was mixed into 25 ml of the prepared solution and stirred to provide a $MoS_2$ slurry that can be agitated/stirred and then applied to the surface of the substrate to be treated.

Figure 5:
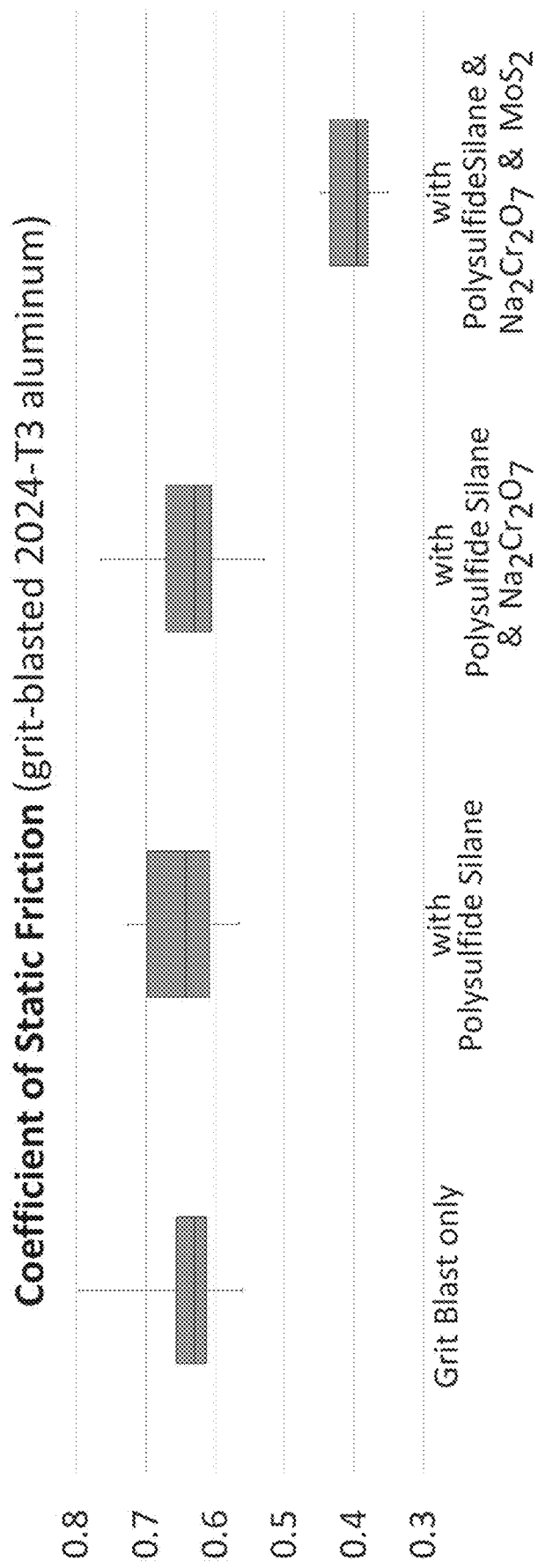
FIG. 5 is a graph showing the static coefficient of friction data for the coating composition of the Example and three comparative samples.

The reduction in the coefficient of friction for 2024-T3-aluminum substrates coated with films made from the composition of Table 1 was measured. For comparison, the coefficients of friction for 2024-T3-aluminum substrates that were: (a) grit blasted only; (b) coated with a polysulfide silane coating; and (c) coated with a composition comprising a polysulfide silane and a corrosion resistance agent were also measured. The results are provided in FIG. 5. As evidenced by the results, the films formed from the composition of Table 1 provided a dramatic decrease in the static coefficient of friction relative to the other samples tested.

In this example, the coatings were applied by brush treatment, although other methods (e.g., spray, immersion, etc.) would also work. All substrates were grit-blasted prior to the application of the composition and the formation of the sol-gel. The different, post-grit-blast treatments were: grit blast only (no coating applied after grit blast); grit blasted and polysulfide silane (bis[TESP]TS); grit blasted and composition of polysulfide silane (bis[TESP]TS) and sodium dichromate; and grit blasted and composition of polysulfide silane (bis[TESP]TS) and sodium dichromate with the addition of $MoS_2$ was to create a slurry—only a small fraction (less than 0.5% by weight) could get into solution (where the solution was primarily methanol). The slurry was applied by brush to the surface, and the solvent evaporated to leave a $MoS_2$-enhanced treatment.

Figure 6:
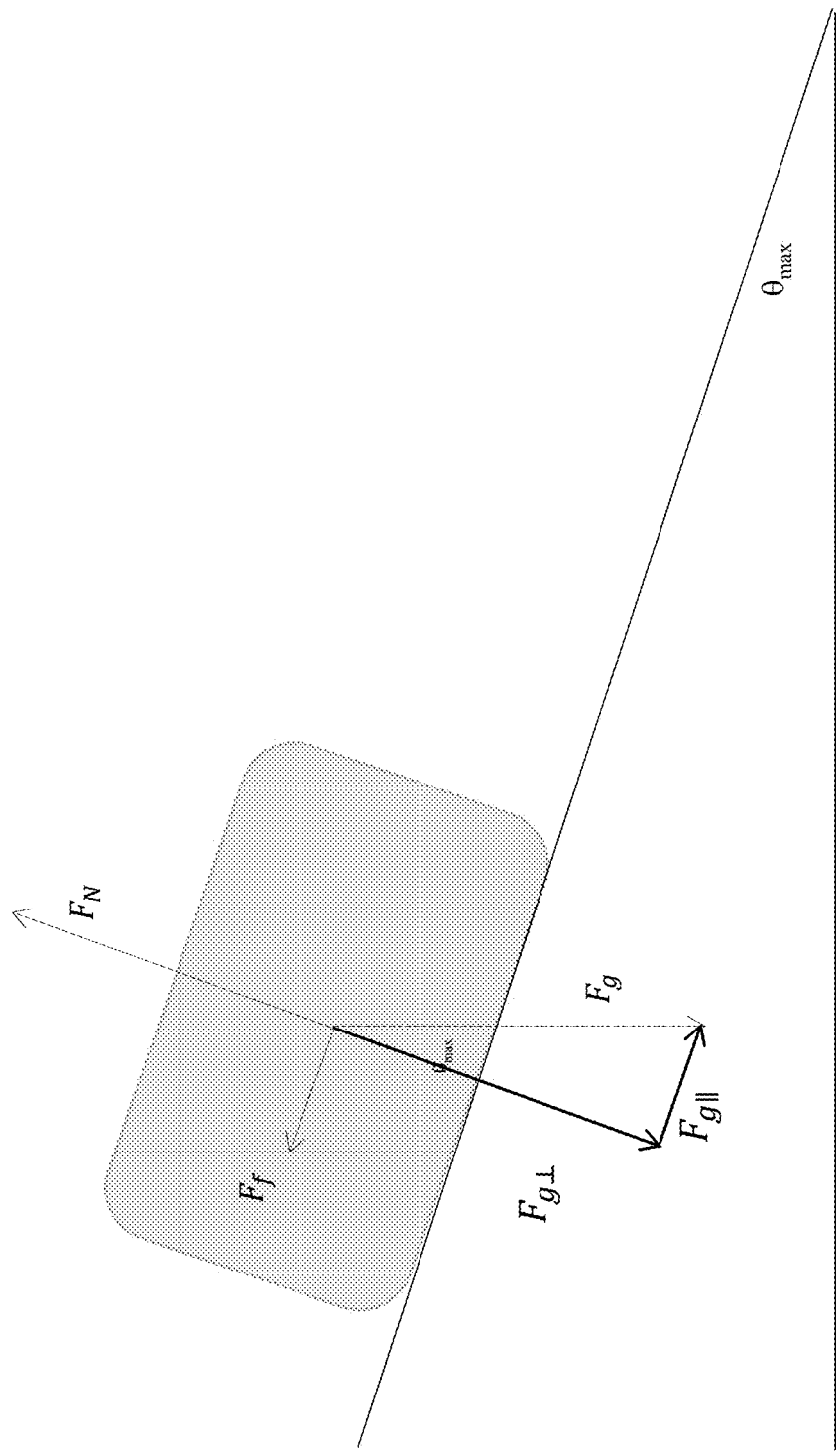
FIG. 6 is a schematic diagram of a set-up for measuring the coefficient of static friction.

The coefficient of static friction was determined using the set up shown in FIG. 6. As shown in that figure, given the object shown below sitting is at rest on an inclined plane, where: $\theta_{max}$ represents maximum angle of inclination that can be obtained before the object begins sliding down the plane; $F_N$ is the normal force on the object from the inclined plane surface; $F_f$ is the frictional force that acts to prevent the object from sliding down the inclined plane; $F_g$ is the gravitational force of the object due to gravitational acceleration (g) of the mass (m) of the object; $F_{g\perp}$ is a vector component of $F_g$ that is perpendicular to the incline surface and is equal and opposite to the normal force $F_f$, and $F_{g\parallel}$ is a vector component of $F_g$ that is parallel to the incline surface and is equal and opposite to the frictional force $F_N$, the coefficient of static friction is the ratio of the frictional force $F_f$ to the normal force $F_N$ and can be expressed as follows:

$$\mu_s = \frac{F_f}{F_N} = \frac{-F_{g\parallel}}{-F_{g\perp}} = \frac{-mg\sin\theta_{max}}{-mg\cos\theta_{max}} = \frac{\sin\theta_{max}}{\cos\theta_{max}} = \tan\theta_{max}$$

Therefore, if an object is place on a plane, the plane is slowly raised on an incline until the object begins to slide and the angle $\theta_{max}$ is observed just prior to movement of the object, the coefficient of static friction can be obtained as $\mu_s = \tan\theta_{max}$.

Example 2

This example illustrates another formulation of a composition for treating a substrate to provide increased lubricity to the substrate surface, while simultaneously imparting adhesive and corrosion resistance properties to the substrate surface. The formulation for this example is provided in Table 2. The composition of Table 2 can be made, characterized, and applied to a substrate surface to form a sol-gel coating using the processes and techniques described in Example 1.

TABLE 2

| | Component | Quantity in Composition | Density (g/ml) | Sample Mass (g) | % Solution by mass (wt. %) | CAS Number |
|---|---|---|---|---|---|---|
| Coupling Agent 1 | APTES >96% | 2 ml | 0.946 | 1.89 | 2.01 | 919-30-2 |
| Coupling Agent 2 | Zirconium Tetrapropoxide >96% | 1 ml | 1.05 | 1.05 | 1.12 | 23519-77-9 |
| Solvent | Methanol | 50 ml | 0.8 | 40 | 42.5 | 67-56-1 |
| Water | Distilled Water | 50 ml | 1 | 50 | 53.1 | 7732-18-5 |
| Acid | Glacial Acetic Acid | 0.4 ml | 1.05 | 0.42 | 0.45 | 64-19-7 |
| Corrosion Resistance Agent | Sodium Dichromate Dihydrate | 0.3 g (0.01M) | — | 0.3 | 0.319 | 7789-12-0 |
| Lubricating Particles | Molybdenum Disulfide | 0.5 g | — | 0.5 | 0.531 | 1317-33-5 |

Example 3

This example illustrates another formulation of a composition for treating a substrate to provide increased lubricity to the substrate surface, while simultaneously imparting adhesive and corrosion resistance properties to the substrate surface. The formulation for this example is provided in Table 3. The composition of Table 3 can be made, characterized, and applied to a substrate surface to form a sol-gel coating using the processes and techniques described in Example 1.

TABLE 3

| | Component | Quantity in Composition | Density (g/ml) | Sample Mass (g) | % Solution by mass (wt. %) | CAS Number |
|---|---|---|---|---|---|---|
| Coupling Agent 1 | GPTMS >96% | 2 ml | 1.08 | 2.16 | 2.54 | 2530-83-8 |
| Coupling Agent 2 | Zirconium Tetrapropoxide >96% | 1 ml | 1.05 | 1.05 | 1.23 | 23519-77-9 |
| Solvent | Methanol | 95 ml | 0.8 | 76 | 89.3 | 67-56-1 |
| Water | Distilled Water | 5 ml | 1 | 5 | 5.87 | 7732-18-5 |
| Acid | Glacial Acetic acid | 0.4 ml | 1.05 | 0.42 | 0.493 | 64-19-7 |
| Corrosion Resistance and Lubricating Agent | 5,5-Dithiobis(1,3,4-thiadiazole-2(3H)-thione) | 0.5 g | 2.09 | 0.5 | 0.587 | 72676-55-2 |

Example 4

This example illustrates another formulation of a composition for treating a substrate to provide increased lubricity to the substrate surface, while simultaneously imparting adhesive and corrosion resistance properties to the substrate surface. The formulation for this example is provided in Table 4. The composition of Table 4 can be made, characterized, and applied to a substrate surface to form a sol-gel coating using the processes and techniques described in Example 1.

TABLE 4

| | Component | Quantity in Composition | Density (g/ml) | Sample Mass (g) | % Solution by mass (wt. %) | CAS Number |
|---|---|---|---|---|---|---|
| Coupling Agent | Bis[TESP]TS >90% | 1.5 ml | 1.08 | 1.62 | 1.89 | 40372-72-3 |
| Solvent | Methanol | 85 ml | 0.8 | 68 | 79.51 | 67-56-1 |
| Water | Distilled Water | 15 ml | 1 | 15 | 17.54 | 7732-18-5 |
| Acid | Glacial Acetic Acid | 0.1 ml | 1.05 | 0.105 | 0.123 | 67-56-1 |

TABLE 4-continued

| | Component | Quantity in Composition | Density (g/ml) | Sample Mass (g) | % Solution by mass (wt. %) | CAS Number |
|---|---|---|---|---|---|---|
| Corrosion Resistance Agent | Sodium Dichromate Dihydrate | 0.3 g (0.01M) | — | 0.3 | 0.3508 | 7789-12-0 |
| Lubricating Particles | Molybdenum Disulfide | 0.5 g | — | 0.5 | 0.585 | 1317-33-5 |

Example 5

This example illustrates another formulation of a composition for treating a substrate to provide increased lubricity to the substrate surface, while simultaneously imparting adhesive and corrosion resistance properties to the substrate surface. The formulation for this example is provided in Table 5. The composition of Table 5 can be made, characterized, and applied to a substrate surface to form a sol-gel coating using the processes and techniques described in Example 1.

TABLE 5

| | Component | Quantity in Composition | Density (g/ml) | Sample Mass (g) | % Solution by mass (wt. %) | CAS Number |
|---|---|---|---|---|---|---|
| Coupling Agent 1 | GPTMS >96% | 2 ml | 1.08 | 2.16 | 2.29 | 2530-83-8 |
| Coupling Agent 2 | Zirconium Tetrapropoxide >96% | 1 ml | 1.05 | 1.05 | 1.11 | 23519-77-9 |
| Solvent | Methanol | 50 ml | 0.8 | 40 | 42.4 | 67-56-1 |
| Water | Distilled Water | 50 ml | 1 | 50 | 52.9 | 7732-18-5 |
| Acid | Glacial Acetic Acid | 0.4 ml | 1.05 | 0.42 | 0.445 | 64-19-7 |
| Corrosion Resistance Agent | Sodium Dichromate Dihydrate | 0.3 g (0.01M) | — | 0.3 | 0.318 | 7789-12-0 |
| Lubricating Particles | Molybdenum Disulfide | 0.5 g | — | 0.5 | 0.529 | 1317-33-5 |

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative examples of the disclosure has been presented for purposes of illustration and of description. It is not intended to be exhaustive or to limit the examples to the precise form disclosed, and modifications and variations are possible in light of the above teachings or may be acquired from practice of the technology described herein. The examples were chosen and described in order to explain the principles of the technology and as practical applications of the technology to enable one skilled in the art to utilize the technology in various examples and with various modifications as suited to the particular use contemplated. It is intended that the scope of the disclosure be defined by the claims appended hereto and their equivalents.

What is claimed is:

1. A coated substrate (304) comprising:
a substrate (304) having a surface (305);
a sol-gel film (302) on the surface (305) of the substrate (304), the sol-gel film (302) comprising:
one or more silanol coupling agents;
lubricating particles; and
a dichromate salt;
wherein the concentration of silanol coupling agents in the sol-gel film (302) is in the range from 20 wt. % to 70 wt. %, based on the solids content of the sol-gel film, the concentration of the dichromate salt in the sol-gel film (302) is in the range from 0.1 wt. % to 10 wt. %, based on the solids content of the sol-gel film (302), and the concentration of lubricating particles in the sol-gel film (302) is in the range from 10 wt. % to 80 wt. %, based on the solids content of the sol-gel film (302); and
an organic coating (306) on the sol-gel film (302).

2. The coated substrate (304) of claim 1, wherein the substrate (304) is a metal substrate (304), the silanol coupling agent is an organosilanol that is a product of hydrolysis of one or more alkoxy groups of bis(triethoxysilylpropyl) tetrasulfide, the lubricating particles comprise molybdenum disulfide particles, and the organic coating (306) comprises sulfide groups.

3. The coated substrate (304) of claim 1, wherein the substrate (304) is a metal substrate.

4. The coated substrate (304) of claim 3, wherein the metal substrate comprises aluminum, an aluminum alloy, magnesium, a magnesium alloy, nickel, a nickel alloy, iron, an iron alloy, steel, titanium, a titanium alloy, copper, or a copper alloy.

5. The coated substrate (304) of claim 1, wherein the organic coating (306) comprises a poly(meth)acrylate, a polyurethane, a polyether, or a polyester.

6. The coated substrate (304) of claim 1, wherein the lubricating particles comprise metal disulfide particles.

7. The coated substrate (304) of claim 6, wherein the lubricating particles comprise molybdenum disulfide particles.

8. The coated substrate (304) of claim 1, further comprising a metal salt of molybdenum, magnesium, zirconium, titanium, vanadium, hafnium, silicon, aluminum, boron, cobalt, zinc, or combinations of two or more thereof.

9. The coated substrate (304) of claim 1, wherein the silanol coupling agent is an organosilanol comprising two or more silanol groups.

10. The coated substrate (304) of claim 9, wherein the silanol coupling agent is a dipodal organosilanol.

11. The coated substrate (304) of claim 10, wherein the silanol coupling agent comprises a polysulfide group.

12. The coated substrate (304) of claim 11, wherein the silanol coupling agent is an organosilanol that is a product of hydrolysis of one or more alkoxy groups of bis(triethoxysilylpropyl)tetrasulfide.

13. The coated substrate (304) of claim 12, wherein the lubricating particles comprise molybdenum disulfide particles.

14. The coated substrate (304) of claim 4, wherein the organic coating (306) comprises a poly(meth)acrylate, a polyurethane, a polyether, or a polyester.

15. The coated substrate of claim 1, wherein the concentration of silanol coupling agents in the sol-gel film (302) is in the range from 20 wt. % to 50 wt. %, based on the solids content of the sol-gel film, the concentration of the dichromate salt in the sol-gel film (302) is in the range from 0.5 wt. % to 6 wt. %, based on the solids content of the sol-gel film (302), and the concentration of lubricating particles in the sol-gel film (302) is in the range from 50 wt. % to 80 wt. %, based on the solids content of the sol-gel film (302).

16. The coated substrate (304) of claim 1, wherein the concentration of silanol coupling agents in the sol-gel film (302) is in the range from 25 wt. % to 45 wt. %, based on the solids content of the sol-gel film, the concentration of the dichromate salt in the sol-gel film (302) is in the range from 1 wt. % to 5 wt. %, based on the solids content of the sol-gel film (302), and the concentration of lubricating particles in the sol-gel film (302) is in the range from 55 wt. % to 75 wt. %, based on the solids content of the sol-gel film (302).

17. The coated substrate (304) of claim 1, wherein the surface (305) comprises hydroxyl groups.

18. The coated substrate (304) of claim 17, comprising silica hydroxylates on the surface (305).

19. The coated substrate (304) of claim 1, wherein the organic coating (306) is a polymer coating.

20. The coated substrate (304) of claim 1, wherein the lubricating particles comprise graphite particles or hexagonal boron nitride (hBN) particles.

* * * * *